United States Patent [19]

Shirato et al.

[11] 4,167,384
[45] Sep. 11, 1979

[54] FILTER SCREEN EXCHANGING APPARATUS FOR PLASTIC EXTRUDER

[75] Inventors: Toru Shirato; Minoru Yoshida; Hideki Mizuguchi, all of Hiroshima, Japan

[73] Assignee: The Japan Steel Works, Ltd., Tokyo, Japan

[21] Appl. No.: 889,588

[22] Filed: Mar. 23, 1978

[30] Foreign Application Priority Data

Nov. 28, 1977 [JP] Japan .................. 52-141572

[51] Int. Cl.$^2$ .............................................. B29F 3/02
[52] U.S. Cl. ............................ 425/183; 210/DIG. 15; 425/185; 425/192 R; 425/199; 425/376 R
[58] Field of Search ........... 210/323 R, 329, DIG. 15; 264/176 R; 366/87; 425/183, 185, 186, 190, 192 R, 199, 376 R

[56] References Cited

U.S. PATENT DOCUMENTS

| 937,676 | 10/1909 | Elliott | 210/329 |
|---|---|---|---|
| 2,513,795 | 7/1950 | Gliss | 425/199 X |
| 3,503,096 | 3/1970 | Marianelli | 425/199 X |

FOREIGN PATENT DOCUMENTS

| 684976 | 4/1964 | Canada | 425/199 |
|---|---|---|---|
| 625983 | 9/1961 | Italy | 425/199 |

Primary Examiner—Mark Rosenbaum
Attorney, Agent, or Firm—Sughrue, Rothwell, Mion, Zinn and Macpeak

[57] ABSTRACT

A filter screen exchanging device having a pair of parallel slide plates 12 disposed in branched passages DK, EL of a plastic resin extruder 10. Each slide plate has a shouldered hole 14 on one side accommodating a breaker plate 15 having a plurality of flow nozzles 20, a filter screen 17, and a threaded screen cap 18 having a plurality of trapezoidal apertures therein. The other side of each slide plate is blind, and the plates are alternately transferred for screen and cap exchange by hydraulic cylinders 13. The extruder operation is thus continuous, the breaker plate is not exchanged with each screen and cap replacement, and the screen mounting arrangement is designed to minimize air entry and resin leakage during slide transfer.

6 Claims, 21 Drawing Figures

FILTER SCREEN EXCHANGING APPARATUS FOR PLASTIC EXTRUDER

BACKGROUND OF THE INVENTION

This invention relates to a filter screen exchanging apparatus for a plastic extruder.

Screen exchanging devices are employed to replace a contaminated filter screen with a new screen in a plastic extruding apparatus without stopping the extrusion operation when a screen becomes so contaminated with foreign objects entrained in the resin that its openings are clogged. The rotary valve type screen exchanging device of the prior art is so constructed that the flow of plastic resin material is switched over by a valve to exchange a filter screen. In this device, however, the characteristics of the plastic resin deteriorate due to stagnation since the flow passage is complicated. Further, since the change-over valve must be rotated under considerable back pressure, great operating force is required. Such a device is only usable with small sized extruders.

A conventional slide type screen exchanging device is shown in FIGS. 1 and 2, wherein a slide plate 2 is perpendicularly disposed in a plastic extruding apparatus 1 and a pair of breaker plates 3 and screens 4 are mounted on the slide plate. The screens 4 are mutually displaced and exchanged in a longitudinal direction by hydraulic cylinders (not shown), and are secured by snap rings 5. In FIG. 2, as a space A near the tip of the extruding screw is filled with plastic resin during operation, and when the slide plate 2 is moved to implement screen exchange, the new screen 4 is liable to be stripped off or bent away due to the pressure of the plastic resin at space B. As a result some unfiltered plastic resin may appear in the final product. Further, in such an exchanging device it is necessary to provide some clearance space C between the outermost surface of the slide plate and the screen 4, whereby air may be introduced into the extruded resin and or some resin may escape to the outside through the space C during the movement of the slide plate 2. This abruptly reduces the pressure of the resin, which takes a long time to restore to its normal level, and such non-uniform extrusion results in defective products.

Furthermore, in a large capacity extruding apparatus the disc-shaped breaker plate must be relatively thick to provide sufficient mechanical strength, which greatly reduces the resin pressure. When used screens are exchanged for new ones the breaker plates must also be exchanged since if they are left exposed to the air the resin adhering to them deteriorates. Recently, large capacity extruding apparatuses have been developed using a breaker plate weighing 30 kg or more and having 1000 flow nozzles therein each 50 mm long and 7 mm in diameter. The diameter of the extruder screw used in such an apparatus is 300 mm. Obviously, screen exchange and breaker plate cleaning in such an apparatus is extremely difficult and costly.

SUMMARY OF THE INVENTION

Briefly, and according to the present invention, the above drawbacks and disadvantages of the prior art are effectively overcome by providing a filter screen exchanging device having a pair of parallel slide plates disposed in branched passages of a plastic resin extruder. Each slide plate has a shouldered hole on one side accomodating a breaker plate having a plurality of flow nozzles, a filter screen, and a threaded screen cap having a plurality of trapezoidal apertures therein. The other side of each slide plate is blind, and the plates are alternately transferred for screen and cap exchange by hydraulic cylinders. The extruder operation is thus continuous, the breaker plate is not exchanged with each screen and cap replacement, and the screen mounting arrangement is designed to minimize air entry and resin leakage during slide transfer. The screen exchanging device of the invention is especially effective for polyolefin type resins.

DETAILED DESCRIPTION OF THE PREFERRED EMBODIMENTS

Figure 1:
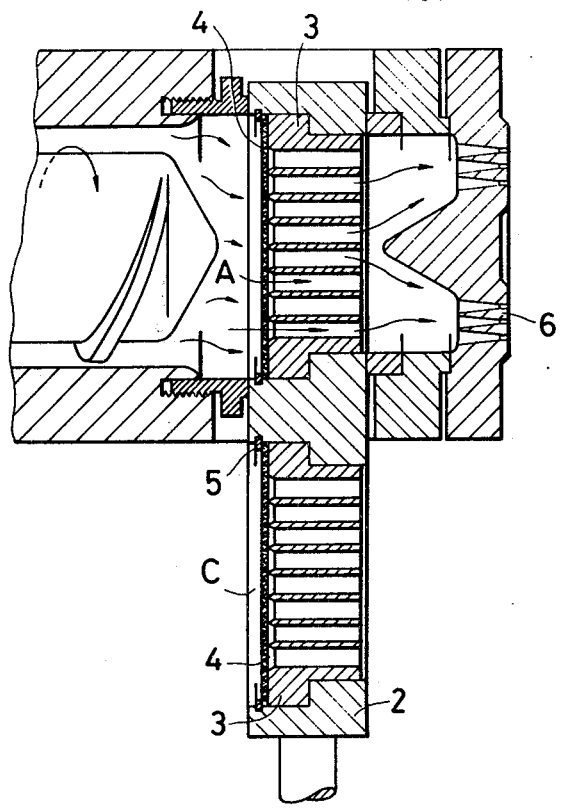
FIG. 1 shows a cross-sectional view of a conventional slide type screen exchanging device.
Figure 2:
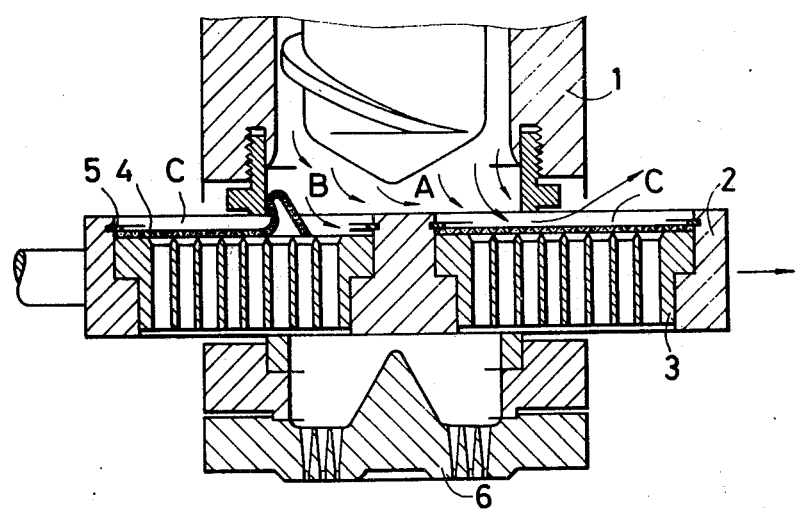
FIG. 2 shows a transient state wherein the slide plate of the conventional device is beng transferred.
Figure 3:
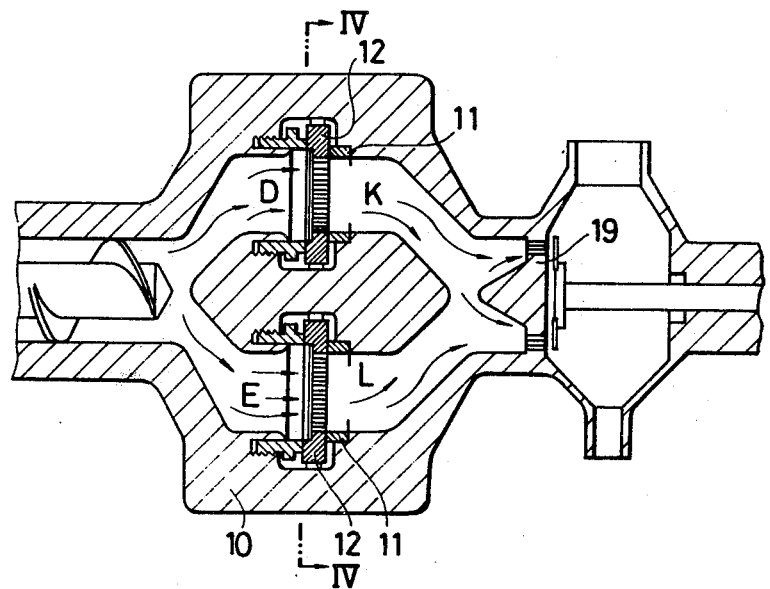
FIG. 3 shows a cross-sectional view of a screen exchanging device according to a preferred embodiment of the present invention.
Figure 4:
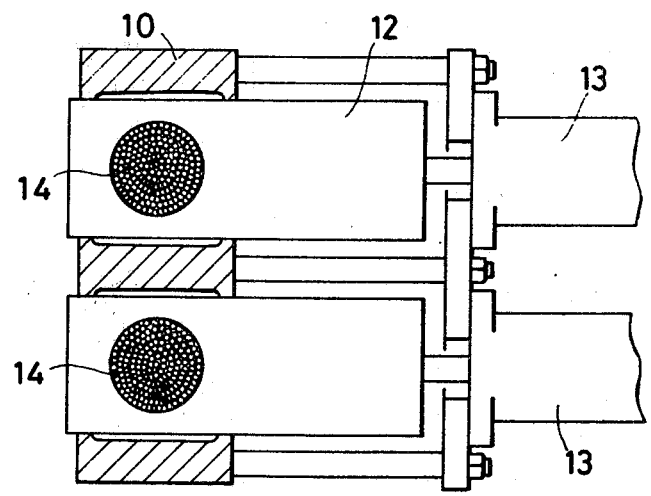
FIG. 4 shows a cross-section taken along line IV—IV in FIG. 3.
Figure 5:
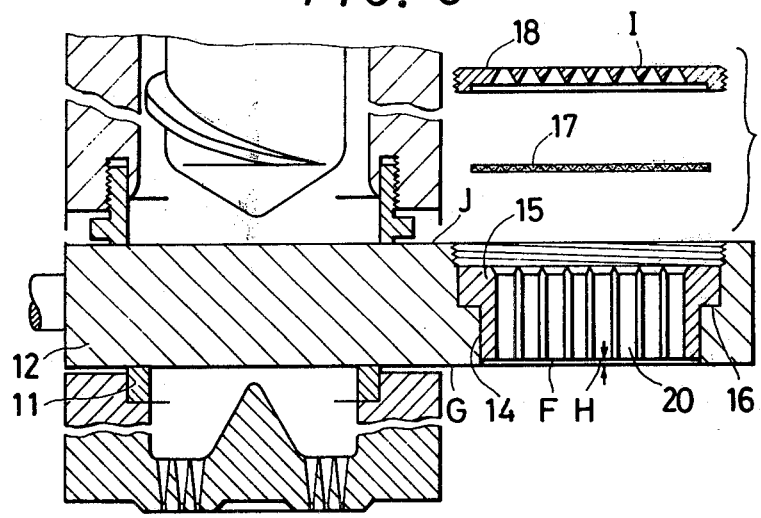
FIG. 5 shows a cross-section of a slide plate of the invention, partly exploded.

In FIGS. 3 and 4, a resin passage branches into a pair of parallel passages D and E within an extruding apparatus body 10. Slide rings 11 are mounted in the passages, and slide plates 12 are slidably disposed adjacent the rings 11 traverse to the resin flow direction. The slide plates 12 are movable by hydraulic cylinders 13, and have stepped holes 14 as shown in FIG. 5. Breaker plates 15 are mounted in the holes in abutment with shoulders 16 such that their lower most surface F is positioned just above the lower surface G of the slide plate 12 by a distance H. A screen 17 is disposed on the breaker plate and firmly retained thereagainst by a screen cap 18 having a screw threaded outer periphery. The distance H has a minimum length so determined that even when the breaker plate 15 is elastically deformed by resin pressure its lower surface F remains above the surface G of the slide plate 12. The upper surface I of the screen cap 18 is positioned at the same level as or lower than the upper surface J of the slide plate. Downstream passages K and L merge into one near an extruding die 19, as shown in FIG. 3.

Figure 6:
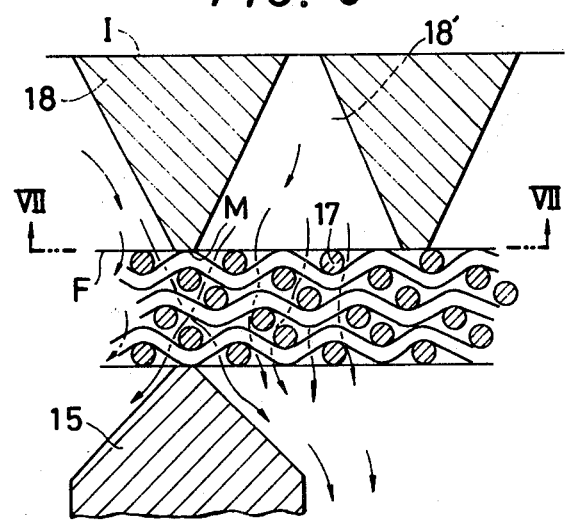
FIG. 6 shows a partial cross-section of a screen cap of the invention.
Figure 7:
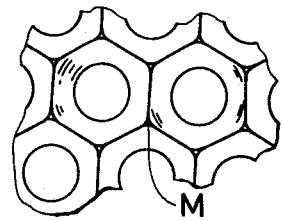
FIG. 7 shows a cross-sectional view taken along lines VII—VII in FIG. 6.

FIG. 6 shows an enlarged sectional view of the screen cap 18, wherein a plurality of holes 18' increase their diameters from the upper surface I to the lower surface M, thereby having trapezoidal cross-sections. The holes are so designed that flat portions are left between adjacent holes on the surface M, as shown in FIG. 7. The breaker plate 15 has a plurality of nozzles 20 which are chamfered at their upstream portions.

Figure 8:
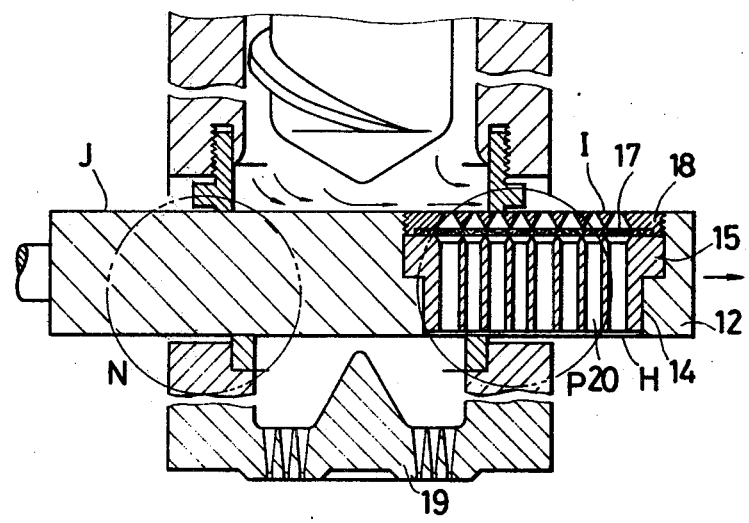
FIG. 8 shows a slide plate of the invention, partially transferred for screen exchange.

In normal or usual operation of the extruding apparatus, the resin is forced through the passages DK and EL as shown in FIG. 3 to thereby accomplish filtering using both of the screens 17, and the filtered resin is introduced into the die 19. When screen exchange is necessary either of the slide plates 12 for the branch passages DK and EL is transferred by its associated hydraulic cylinder 13. FIG. 8 shows a transient state of movement of a slide plate 12. The encircled portion N of the slide plate has flat upper and lower surfaces in intimate contact with the extruder ring, whereby no air is introduced into the extruder and no resin escapes therefrom. In the upper part of the other encircled portion P, the resin near the screen 17 is substantially sealed because the uppermost surface I of the screen cap 18 is at approximately the same level as the upper surface J of the slide plate 12; in the lower part small amounts of resin escape from the extruder ring because of the spacing distance H. This overflow does not affect the end products or the extruder operation, however.

Figure 9:
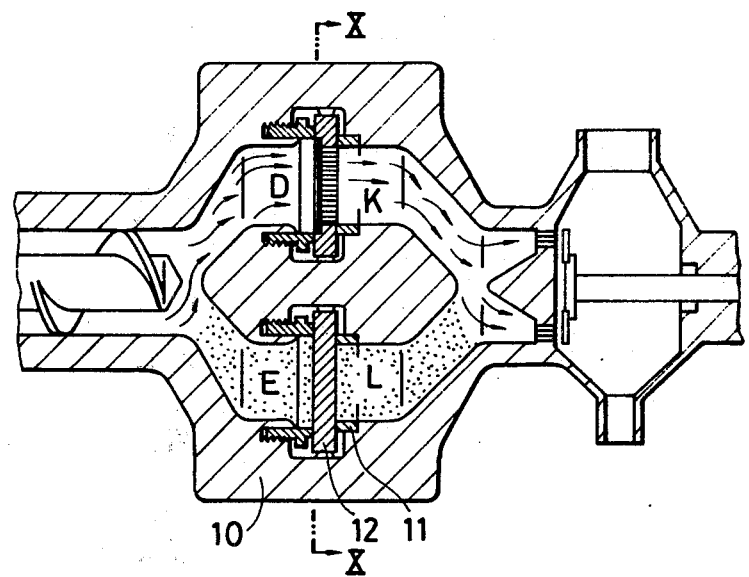
FIG. 9 shows the lower extruder branch passage completely blocked by the blind side of a slide plate.
Figure 10:
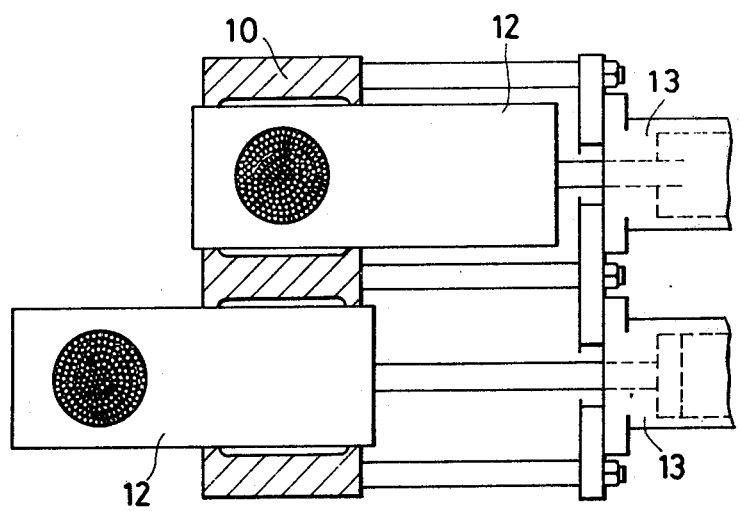
FIG. 10 shows a cross-sectional view taken along with a line X—X in FIG. 9.

In FIGS. 9 and 10 the lower slide plate is completely switched or transferred, whereby the passage EL is blocked while resin flows through the other passage DK. The operation of the extruder is thus continuous. In this state the exposed screen mounted on the lower slide plate 12 and the associated screen cap are removed as shown in FIG. 5 and exchanged for a new screen and cap. It is unnecessary to exchange the exposed breaker plate 15 for a new one.

Figure 11:
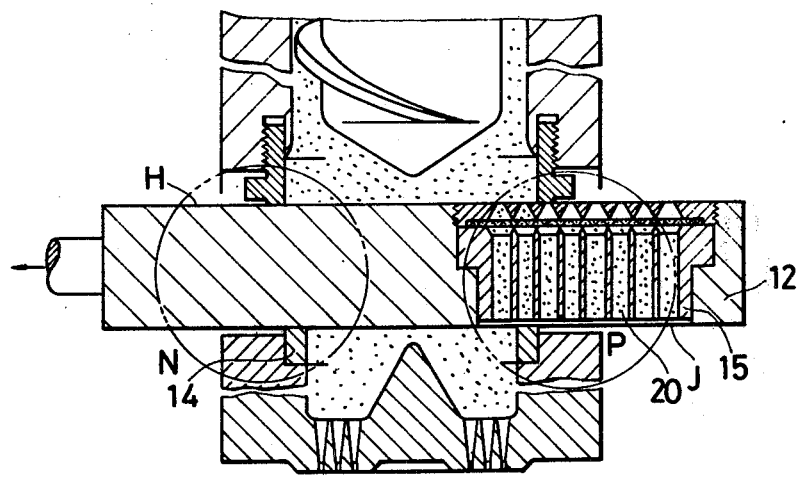
FIG. 11 shows the slide plate partially returned to its operational position.

The lower slide plate 12 is next returned to its original filtering position by the hydraulic cylinder 13, as shown in FIG. 11. In this operation no air is introduced into the extruder in the region N and no resin escapes, as described above. Because the breaker plate 15 is not exchanged the nozzles 20 thereof remain filled with resin and the air within the screen 17 and cap 18 is expelled out corresponding to the resin filling, and thus no air is introduced into the extruder in the region P. Further, since the slide plate 12 is moved against the resin leakage direction during its return, little resin leakage occurs. The exchange of the screen and cap in the other slide plate is accomplished in the same manner.

Figure 12:
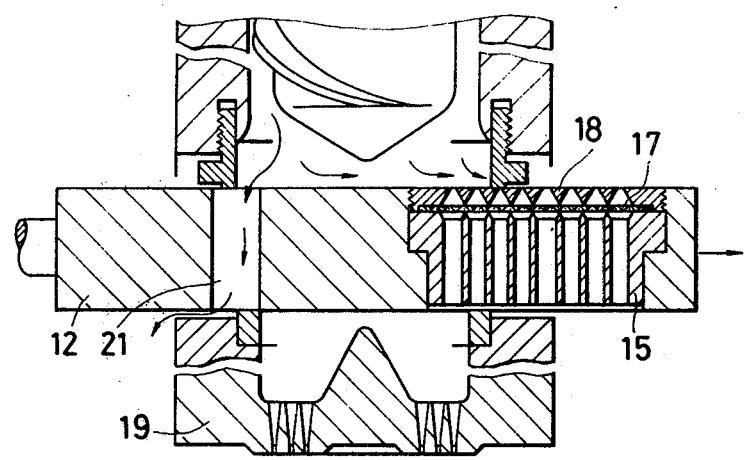
FIG. 12 shows a modified slide plate according to the present invention, FIGS. 13 $(a)$-13$(h)$ show comparative sequences of screen exchanging steps according to the present invention and the prior art.

With a high performance extruder for use with particular resins having a high viscosity in the molten state, a through-hole 21 may be provided in the slide plates as shown in FIG. 12 so that the resin pressure loss through the breaker plate and screen is equal to that through the hole. The dimensions and position of the through-hole 21 are so determined that the resin within the extruder die 19 is not released until the air within the through-hole is completely exhausted, whereby resin pressure variations can be minimized during slide plate changeover, and after changeover the pressure increase due to one-way operation can also be prevented. During the changeover, some unfiltered resin is extruded, but since the screen exchange time is very short, the resin is usually suitable for the end product. If very pure resin is required, then the small amount of unfiltered resin extruded during each changeover may simply be discarded.

Figure 13:
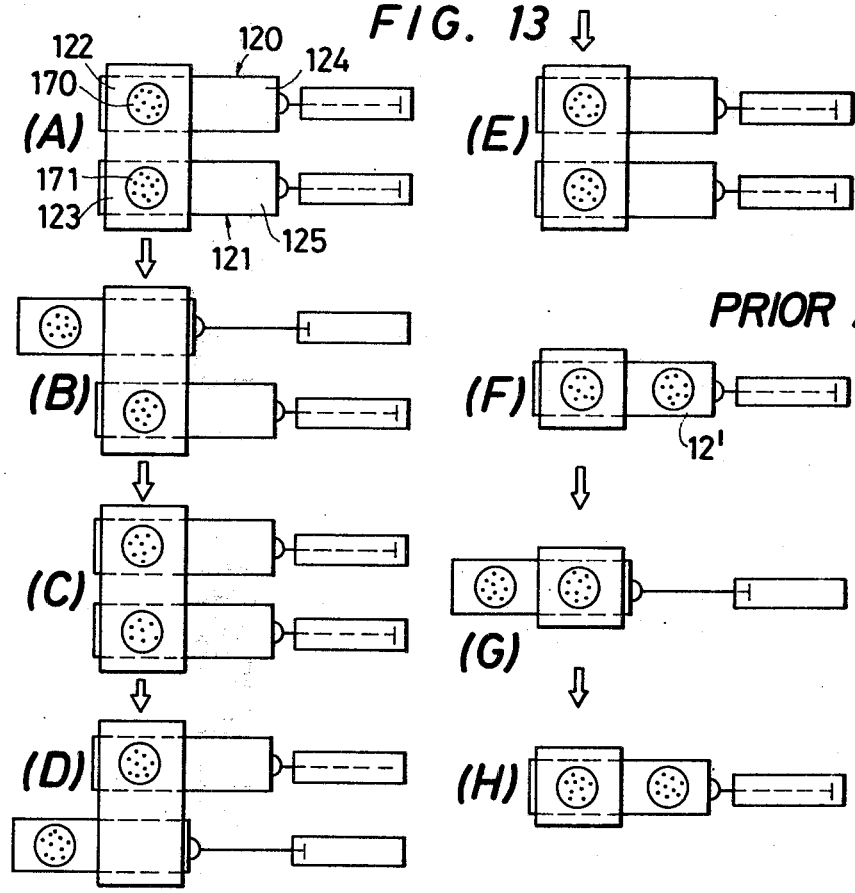

FIGS. 13(a) to 13(e) illustrate the sequential screen exchanging operation according to the present invention. In the exchanging device shown in FIG. 13(a) the screens 170 and 171 are mounted on portions 122 and 123 of the slide plates 120 and 121, respectively, while portions 124 and 125 of the slide plates are totally blind. In FIG. 13(b) screen 170 is exposed by an associated hydraulic cylinder for exchange, and the extruding operation is continued through the screen 171. During this time a new screen is mounted on the slide plate 120. In FIG. 13(c) the slide plate 120 is returned to the position shown in FIG. 13(a). In FIG. 13(d) the slide plate 121 is transferred for screen exchange, and in FIG. 13(e) both of the freshly screened slide plates are returned to their normal operating positions.

FIGS. 13(f), and (h) show a conventional screen exchanging device sequence. In FIG. 13(f) a normal extruding operation is carried out. In FIG. 13(g) the slide plate 12' is switched over to exchange the used screen for a new one, and in FIG. 13(h) the slide plate is returned to the position shown in FIG. 13(f) after the screen exchange.

Figure 14:
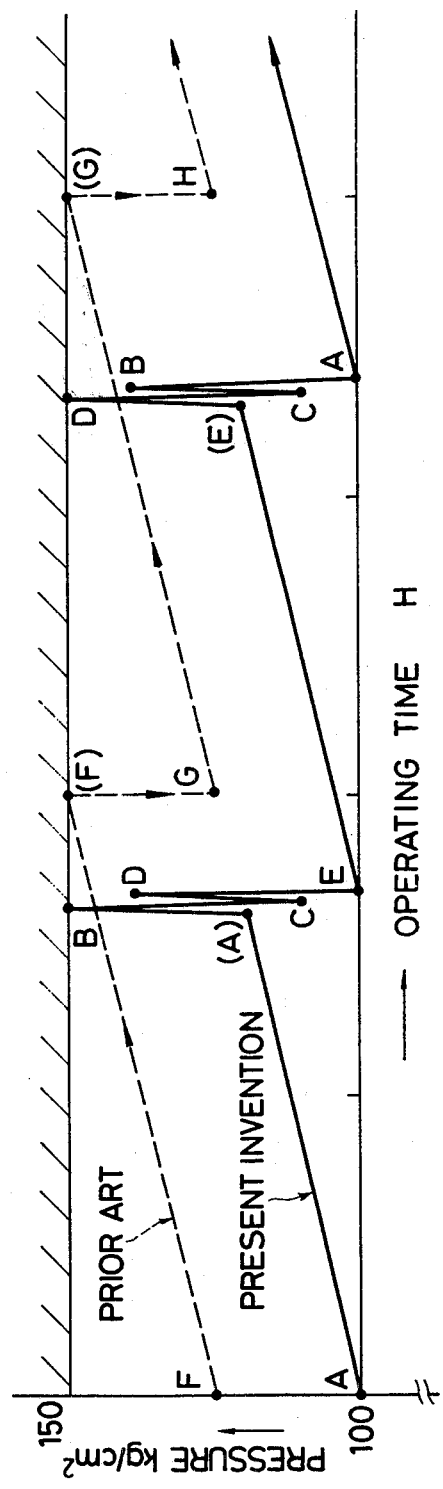
FIG. 14 shows plots of resin pressure versus operating time at points corresponding to those shown in FIG. 13.

FIG. 14 shows a plot of the resin pressure versus time. The suffixed letters of FIG. 13 corrspond to the points represented by the same letters in FIG. 14, whrein the hatched zone represents the upper limit of the mechanical strength of the screens.

The present invention is applicable to a large capacity extruder since the volume of extruded resin is enhanced by the wide filtering surfaced parallel screen pairs, and the resin pressure loss is greatly reduced as compared with the prior art.

We claim:

1. A filter screen exchanging device for a plastic resin extruding apparatus having branched resin flow passages, comprising:
   (a) a pair of elongated, generally planar slide plates arranged in parallel with each other and individually slidably disposed in associated resin flow passages transverse to the resin flow direction,
   (b) a through-hole in one half of each slide plate, the other side of each slide plate being solid,
   (c) an apertured breaker plate mounted in each through-hole,
   (d) a filter screen disposed over each breaker plate on its upstream side,
   (e) an apertured screen cap overlying each filter screen and removably secured in the respective through-hole to rigidly retain said filter screen in place, and
   (f) means for selectively transferring each slide plate between a first postion whereat its filter screen is disposed in the associated resin flow passage and a second position whereat its filter screen is exposed for removal and replacement and its solid side blocks its associated resin flow passage.

2. A device as defined in claim 1, wherein a bypass through-hole is provided in the other half on each slide plate, the diameter of said bypass through-hole being such that the resin pressure drop thereacross when the slide plate is in its second position is substantially equal to the resin pressure drop across the breaker plate, filter screen and screen cap when the slide plate is in its first position.

3. A device as defined in claims 1 or 2, wherein the upstream surface of each screen cap approximately at the same level as the upstream surface of is associated slide plate.

4. A device as defined in claim 3, wherein the upstream surface of each screen cap is disposed in the same plane as the upstream surface of its associated slide plate.

5. A device as defined in claim 3, wherein the upstream surface of each screen cap is slightly recessed with respect to the upstream surface of its associated slide plate.

6. A device as defined in claims 1 or 2, wherein each screen cap aperture has an increasing diameter in the downstream direction.

* * * * *